Patented Sept. 10, 1935

2,013,813

UNITED STATES PATENT OFFICE 2,013,813

PROCESS FOR THE UTILIZATION OF BATTERY PLATE SCRAP

Alfred M. Thomsen, San Francisco, Calif., assignor to Thomsen Chemical Corporation, a corporation of California No Drawing. Application May 6, 1932, Serial No. 609,765

3 Claims. (Cl. 75—18)

The development of the storage battery has given rise to a new form of industrial waste,—namely, old battery plates. Such battery plates are really a mixture of two different substances; the metallic grid, which is composed of antimonial lead, and the "paste", with which the grid is filled. Such paste is composed of a mixture of the oxides and sulphates of lead, and it is entirely free from antimony. Direct blast furnace smelting of this kind of a mixture can, of course, only result in the recovery of a low-antimony alloy, for, as the ingredients described are present in about equal proportions, it follows that the resultant metal will only contain half of the antimony required to qualify as antimonial lead.

The customary reclamation practice of to-day is to charge the plates into a cupola, and to smelt them, with coke as fuel, into a low-grade, impure antimonial lead. This operation is attended by much loss, and virtually puts this high grade material in the same class as an undesirable antimonial lead ore. In order to purify the resultant low-grade metal obtained from present day practices, it must be liquated at least once, if not twice, drossed, oxidized and reduced. It must then be brought up to market standards by the addition of the requisite amount of metallic antimony,—all of which means considerable expense.

My improved process varies radically from these present day practices. To elucidate:

If we consider the difference in melting point between the metal portion and the "paste", we find that the metal fuses at below 350° C., that lead oxide fuses at about 900° C., and lead sulphate at over 1100° C. It is therefore evident that if the material be heated to a temperature intermediate between these extremes, then there will be effected a separation between the "paste" and the metallic portion. Furthermore, as the specific gravity of the metal is over 11, and the specific gravity of the "paste" somewhere between 9 (for lead oxide) and 6 (for lead sulphate), depending upon the relative quantities of these substances present, it will be evident, also, that the tendency of the lead will be to settle to the bottom, and for the "paste" to float on top of the melted lead.

This operation may be carried out in any type of furnace or in a melting kettle, but I prefer the use of a revolving roaster in which the solid oxidized lead compounds may readily be retained while the mobile fused lead is allowed to flow away, either continuously or intermittently.

Having thus separated the fusible from the infusible portion of the charge, the temperature is raised to the point at which the sulphur compounds are broken down with the formation of lead oxide, and the operation continued as a roasting step until only crude litharge remains in the roaster. This is then discharged for further manipulation, and will hereafter be referred to under the appelations of "calcines".

Manifestly, it is impossible to separate the metallic portion from the non-metallic portion of battery plates with absolute precision. A small amount of shots, or globules, of antimonial lead will be retained in the pulverulent residue remaining in the furnace, and this metal will in the ensuing roasting step be converted into oxide. The crude litharge will therefore contain a certain small percentage of antimony oxide. Should it be desirable to render this percentage as small as possible then the pulverulent residue remaining after the liquation of all the metal that may be drawn from the furnace, is discharged, cooled, and passed through a mill, such as a set of rolls, or a rod mill. As the "paste" is very brittle, the effect of the mill will be to reduce it to a powder. As the shots of lead, in spite of their antimony content, are still somewhat malleable, they will flatten if not too harshly treated. The ground residue may therefore undergo a further purification by means of screening, most of the mechanically admixed antimonial lead being retained upon the screen, while the undersize will be almost free from antimony. The further roasting of this undersize to crude litharge will be much facilitated by the fact that it is now in the form of a fine powder and the roasting time will therefore be much shortened. It, also, will be evident that this form of mechanical treatment could be applied to the plates themselves, but not as efficiently as to the liquated residues here described.

The further treatment of the calcines now consists in dissolving them in appropriate acids. Nitric, hydrochloric, or acetic acids would be those commonly used from an economic standpoint, but any acid capable of forming a soluble lead salt, on the one hand, and an insoluble oxysalt of antimony, on the other, may evidently be employed. Thus treated, the calcines will yield a solution of the lead salt corresponding to acid selected, and an antimonial residue, which may be separated from the solution by settling, or by any other customary procedure.

Sundry modifications suggest themselves as being possible, thus:—the antimony may be allowed to remain in the charge by omitting the liquation step, and the crude litharge will thus contain about 4% of antimony, as oxide. The purity of the resultant lead solution will not be affected by this procedure, as the antimony will only remain behind as the oxy-salt, but it will involve the need of some disposal of this residue. It may, of course, serve as raw material for any antimony process, but I prefer to convert it directly into sodium antimonate by roasting with sodium carbonate, or sodium nitrate, or a mixture of both, and by subsequent washing to remove soluble salts.

Another modification would consist in the softening of the antimonial lead and working up the resultant slag in a similar manner for lead and antimony compounds. I therefore state expressly that I do not confine myself to the illustrations here given, but that they are used only as illustrations, to make plain the general working of my process. In special cases, as where peculiar impurities are present, it might, also, be desirable to further purify the lead solution by submitting it to crystallization,—thus obtaining the required purity in the separated salt.

I claim:—

1. The process of treating battery plate scrap, which comprises separating said scrap into antimonial lead of high antimony content and lead compounds of low antimony content, roasting the latter to convert same into the mixed oxides, treating the calcines with an acid capable of forming soluble lead salts and insoluble oxy-salts of antimony, and separating the lead solution from the antimonial residue.

2. The process of treating battery plate scrap, which comprises converting said scrap into a product consisting of the mixed oxides; treating said oxides with acids capable of forming soluble lead salts and insoluble oxy-salts of antimony, thus obtaining a solution of the lead and an insoluble antimonial residue; separating these from one another by appropriate means; roasting said antimonial residue with a suitable soda salt, and washing to remove soluble soda compounds, thus obtaining the lead of the battery plates in the form of soluble salts of lead and the antimony in the form of sodium antimonate.

3. The process of treating battery plate scrap, which comprises separating said scrap into antimonial lead of high antimony content and lead compounds of low antimony content; roasting the latter to convert same into the mixed oxides; treating the calcines with an acid capable of forming soluble lead salts and insoluble oxy-salts of antimony; separating the lead solution from the antimonial residue; then softening the antimonial lead first obtained; thereafter submitting said antimonial residue from this operation to the action of acids capable of forming soluble salts of lead and insoluble oxy-salts of antimony; and thereafter separating the soluble salts of lead from the insoluble antimonial residue; thus obtaining the lead partly in the form of soft lead, and partly in the form of soluble salts of lead, while the antimony of said plates is obtained as the insoluble oxy-salt corresponding to the acid selected for the operation.

ALFRED M. THOMSEN.